United States Patent
Rouse

(10) Patent No.: US 12,474,000 B2
(45) Date of Patent: Nov. 18, 2025

(54) PORTABLE WATER CARRIER PUMP ADAPTER AND KIT

(71) Applicant: LONE ROCK CONCEPTS, LLC, Saratoga Springs, UT (US)

(72) Inventor: Dwight Rouse, Saratoga Springs, UT (US)

(73) Assignee: Lone Rock Concepts, LLC, Draper, UT (US)

( * ) Notice: Subject to any disclaimer, the term of this patent is extended or adjusted under 35 U.S.C. 154(b) by 198 days.

(21) Appl. No.: 18/368,009

(22) Filed: Sep. 13, 2023

(65) Prior Publication Data

US 2024/0084934 A1  Mar. 14, 2024

Related U.S. Application Data

(60) Provisional application No. 63/406,612, filed on Sep. 14, 2022.

(51) Int. Cl.
*F16L 15/00* (2006.01)
*B67D 1/00* (2006.01)
*F04B 39/12* (2006.01)

(52) U.S. Cl.
CPC .......... *F16L 15/007* (2013.01); *F04B 39/123* (2013.01); *B67D 1/0004* (2013.01); *F16L 15/008* (2013.01)

(58) Field of Classification Search
CPC ....... F16L 15/007; F16L 15/008; F04B 9/123; F04B 17/00; B67D 1/0004; B67D 7/62; B67D 1/0003; B67D 1/0042; F04D 13/068; F04D 13/16
USPC ........ 222/383.1, 372, 189.06, 251, 382, 401
See application file for complete search history.

(56) References Cited

U.S. PATENT DOCUMENTS

| | | | |
|---|---|---|---|
| 9,133,015 B2 * | 9/2015 | Taylor | B67D 1/0857 |
| 2004/0050875 A1 * | 3/2004 | Kobayashi | G01F 13/005 |
| | | | 222/383.2 |
| 2010/0301068 A1 * | 12/2010 | Oliver King | A45C 7/0059 |
| | | | 222/95 |
| 2024/0384823 A1 * | 11/2024 | Brown | B65D 51/24 |

* cited by examiner

*Primary Examiner* — David J Walczak
(74) *Attorney, Agent, or Firm* — Travis Banta; Loyal IP Law, PLLC

(57) ABSTRACT

Systems and devices include an adapter which connects a pump to a water carrier. The adapter includes a port through which the pump can draw water out of the water carrier. The pump may further include a pump collar, which also includes a port, and connects to the adapter. The pump may be connected to the pump collar.

20 Claims, 8 Drawing Sheets

PORTABLE WATER CARRIER PUMP ADAPTER AND KIT

BACKGROUND

Water is essential to life on Earth. Whether it is animals who live in the water or plants, animals, and people who live on land, all living beings require water to maintain life. Many land animals make long and arduous migrations from place to place in search of a source of water because they are unable to carry water away from a water source.

Humans have developed many ways to carry water away from water sources. Historically, those water carriers were made from animal skins, stomachs, or bladders. As technology moved on, humans created portable vessels, such as clay pots, which served to not only move water from one place to another, but also to store water for later use. Technology further developed in the era of the Roman Empire to create aqueducts which allowed water to travel naturally with gravity from a source to a city or village for a convenient water supply. More recently, piping has been installed in cities which supplies running water to municipalities on demand.

Today, water has become so readily available, little thought is given to how water arrives at a kitchen faucet or a bathroom showerhead. However, people who travel into undeveloped areas, such as mountains or deserts become quickly aware that a water supply is critical. In other words, as soon as people do not have access to water, significantly more thought and effort is given to its acquisition and use than would normally be applied within a municipality.

Because water is so critical, many efforts have been made to develop water carriers that are convenient for water storage. There are many examples of water storage carriers and water storage vessels that have been developed for a variety of different reasons. For example, since water weighs a little over 8 pounds per gallon, water can be hard to transport in sufficient quantity to supply adventurers on a camping trip for a significant length of time. On the other hand, backup water supplies may also be maintained in larger water vessels that are less mobile. For example, 55 gallon drums are frequently used as backup water storage vessels in homes where the drum is intended to be largely immobile except in the worst of emergencies. Larger water tanks exist for so called "off grid" living locations which may hold thousands of gallons of water.

Smaller water containers have been developed to allow human beings to carry water more easily to locations where clean water is not readily available. For example, Overlanders enjoy driving vehicles over long distances in frequently hot climates and in areas where no water naturally occurs or in other harsh terrain. Overlanders, and other adventurers, may opt to take 12 oz water bottles, or a 1 gallon jug, or a 5 gallon jug for convenience of access to water. In general, a 5 gallon jug having a weight of just over 40 pounds is a substantial amount of water but, simultaneously, has a weight that is reasonable for a single person to carry.

These water containers typically include threaded openings to which a valve is attached. The valve typically includes a push button or a spigot lever which opens and closes the valve to allow water to flow out of the container for use. These valves can be wasteful of water, however, because the containers typically are gravity fed. First, these containers must be re-arranged from a traveling position with valve on the top of the container (to ensure there is no water leakage) into a use position where the valve is set over, for example, the edge of a table or a tail gate or on a stump of a tree. This allows water to flow to the valve for selective control over water flow out of the container and also provides access to the water as it falls over the exemplary edge of the table, tail gate, or stump of a tree. As mentioned, these valves, and lever actuated valves, specifically, can be wasteful of water because when the valve is on, the gravity assisted waterflow is constant. For example, if a person turns on the valve, water begins to flow before the user can put cupped hands under the valve to fill their hands with water, which wastes water before it can be stored in the user's hands. Next, the user may splash the water into the user's face to wash dirt away or to cool off. However, while the user is applying water to the user's face, water still falls through the valve, wasted, until the user has a free hand to turn the valve off. Wasted water can be a major detriment to water supplies.

Push button valves require the user to hold the button down with one hand which does not suffer the same issue of water wastage. But, at the same time, makes access to the water a one handed affair.

Thus, while water containers are readily available for those who store water in large quantities in a location where they live and for those who are away from clean water access for a short amount of time, there is a need to create access to the water without wastage and without limiting water desired by a user.

It is therefore one object of this disclosure to provide an adapter which may be fitted to a container of any size, which allows for an electric pump to interface directly with the container. It is a further object of this disclosure to provide a kit which includes adapters to attach an electric pump to various water types of water carriers, such as an adapter for a small water container and a 55 gallon water drum.

SUMMARY OF THE DISCLOSURE

Disclosed herein is an adapter including a flange connected to a threaded protrusion which connects, by the threads, to an electric pump. Systems and devices include an adapter which connects a pump to a water carrier. The adapter includes a port through which the pump can draw water out of the water carrier. The pump may further include a pump collar, which also includes a port, and connects to the adapter. The pump may be connected to the pump collar.

Further disclosed herein is a kit having a plurality of adapters including a flange connected to a threaded protrusion which connects, by the threads, to an electric pump, where the adapters include an adapter for a portable water container and a non-portable water container. The kit may further include a pump collar.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

In the following description of the disclosure, reference is made to the accompanying drawings, which form a part hereof, and in which is shown by way of illustration specific implementations in which the disclosure is may be practiced. It is understood that other implementations may be utilized, and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are displayed or described in another embodiment or figure. In other words, elements in the figures may be interchangeable between various embodiments disclosed herein, whether shown or not.

Figure 1A:
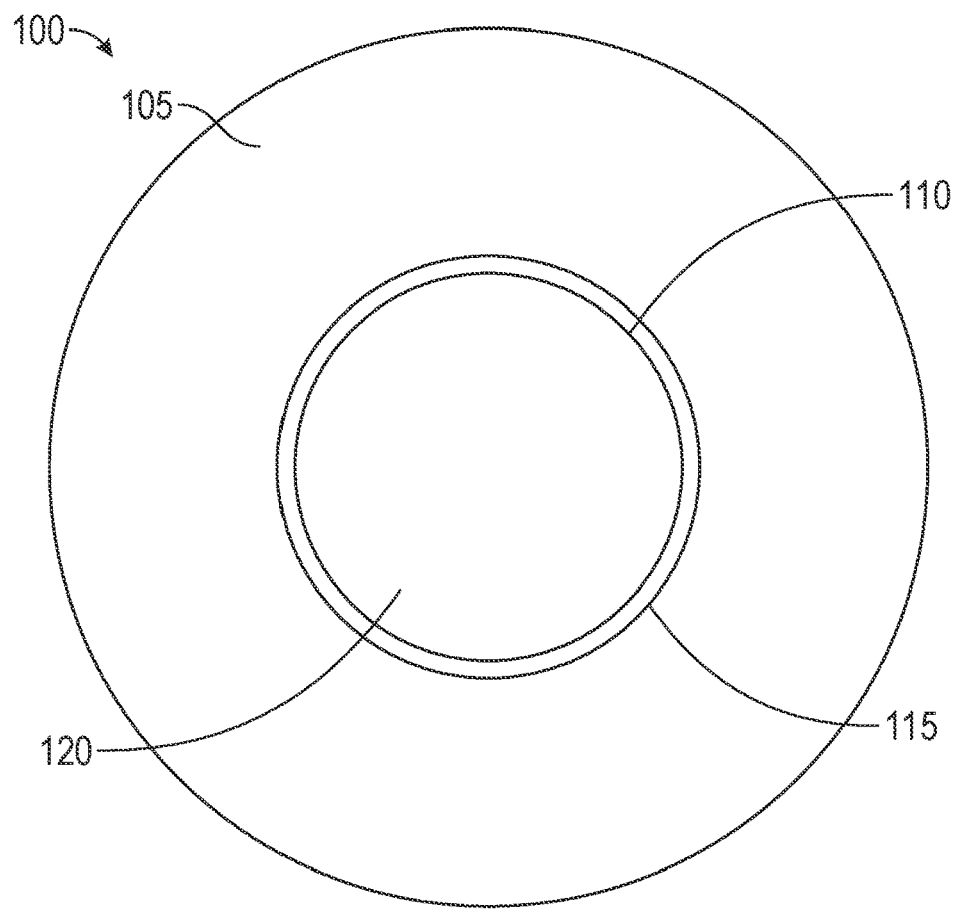
FIG. 1A illustrates a top view of one embodiment of a water carrier adapter device.

FIG. 1A illustrates a top view of one embodiment of a water carrier adapter device 100. Water carrier adapter device 100 includes a flange 105, a protrusion 110 about which are disposed helical threads 115. Protrusion 110 may include a port 120 for allowing water, or any other liquid, to flow through water carrier adapter device 100. Typically, water carrier adapter device 100 may be made using a plastic or metal material and may be fashioned using any techniques known to those of ordinary skill in the art including additive manufacturing, 3D printing, and milling.

Figure 1B:
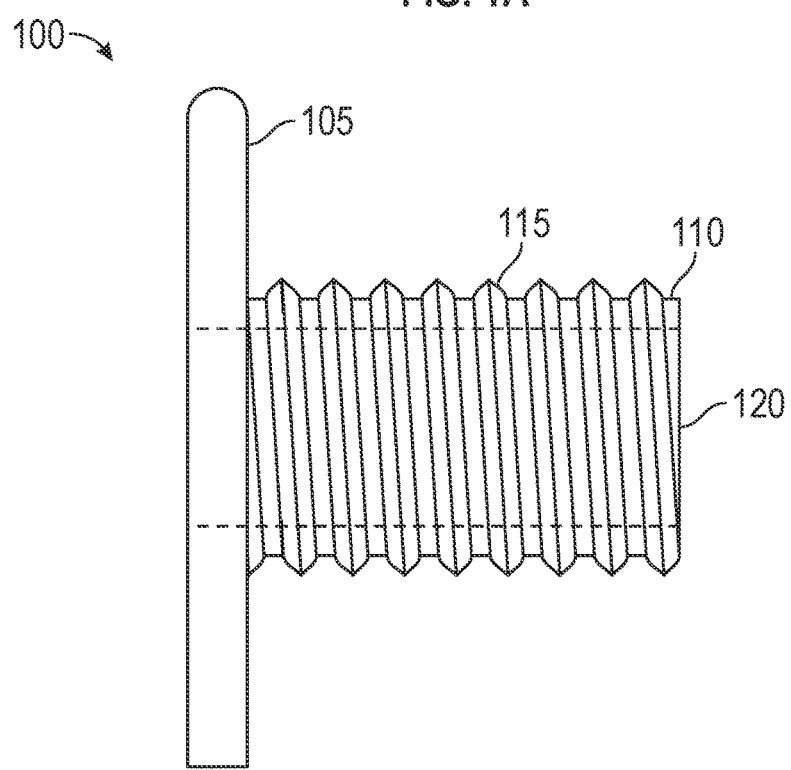
FIG. 1B illustrates a side view of one embodiment of a water carrier adapter device.

FIG. 1B illustrates a side view of one embodiment of a water carrier adapter device 100. Water carrier adapter device 100 shown in FIG. 1B is a view that is different from that of FIG. 1A but illustrates the same water carrier adapter device 100. Water carrier adapter device 100 includes a flange 105, a protrusion 110 which includes helical threads 115 disposed about an outside of protrusion 110 and a port 120 for allowing water, or any other liquid, to flow through water carrier adapter device 100. Water carrier adapter device 100 may be suitable for standard portable water containers which are defined as those water carriers that hold 10 gallons of water or less.

Figure 2A:
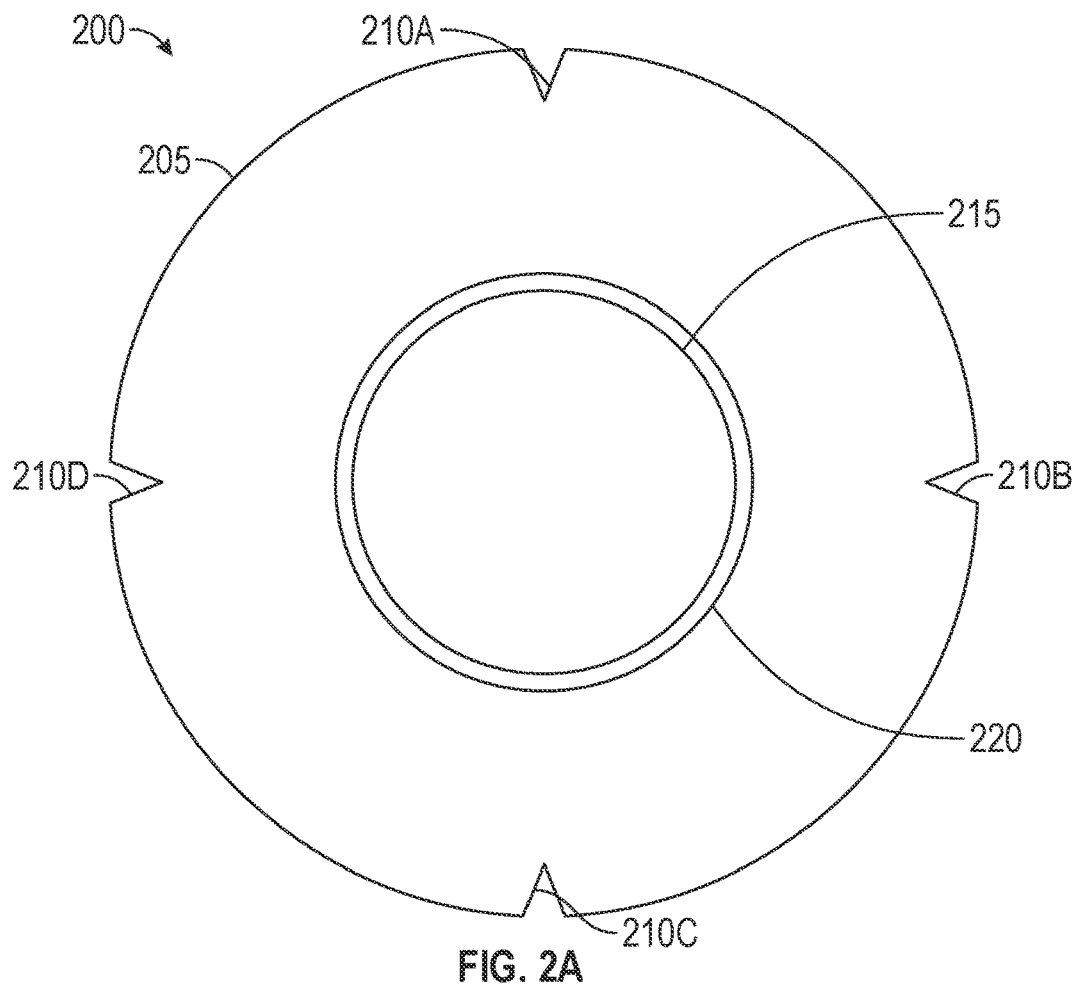
FIG. 2A illustrates a top view of one embodiment of a pump collar device.

FIG. 2A illustrates a top view of one embodiment of a pump collar device 200. Pump collar device 200 includes a body 205. Body 205 includes a plurality of notches 210A, 210B, 210C, and 210D which are positioned at 90° about an exterior circumference of body 205. It is noted that the number of notches and relative angle between notches shown in FIG. 2 is merely explanatory. Pump collar device 200 may include more or fewer notches or more notches than those shown. Notches 210A-210D may interface with corresponding plugs of a similar shape and size such that the plugs may slide into notches 210A-210D to connect pump collar device 200 to an electric pump, as will be discussed below. Pump collar device 200 may further include a port 215 which allows water to pass through and threads 220 within port 215 that connect to either protrusion 110 or protrusion 315, as will be discussed below. Pump collar device 200 may be made using a plastic or metal material and may be fashioned using any techniques known to those of ordinary skill in the art including additive manufacturing, 3D printing, and milling.

Figure 2B:
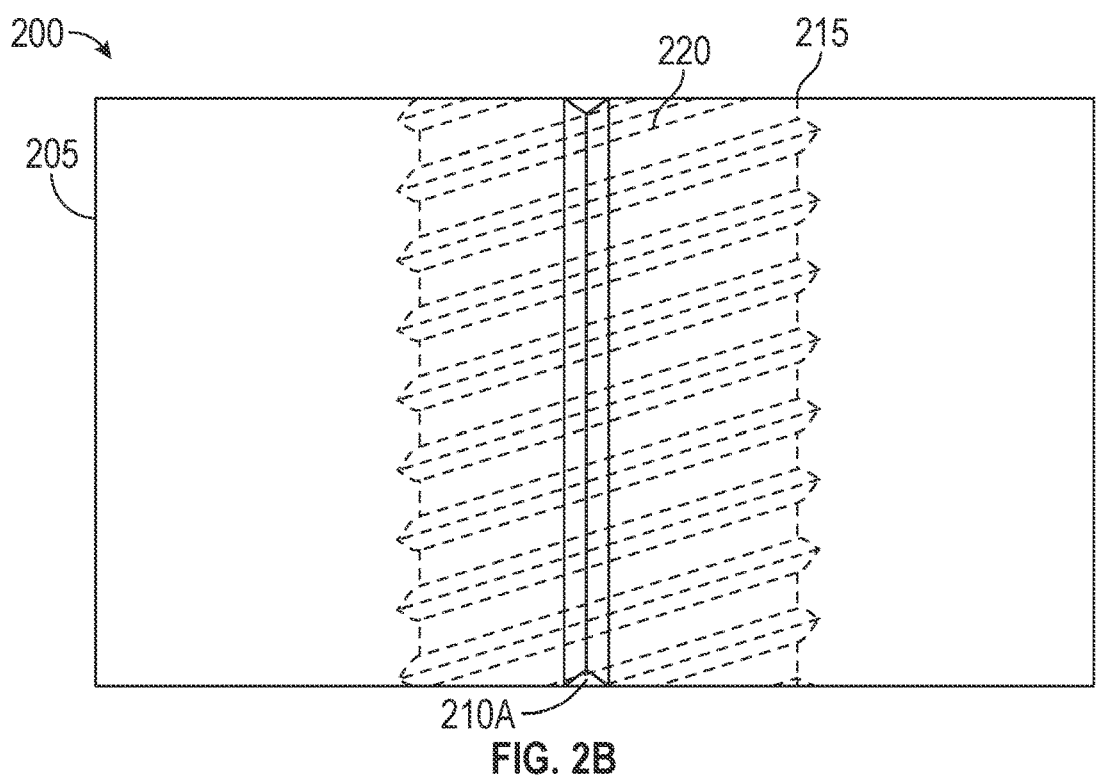
FIG. 2B illustrates a side view of one embodiment of a pump collar device.

FIG. 2B illustrates a side view of one embodiment of a pump collar device 200. As shown in FIG. 2, pump collar device 200 includes a body 205. Body 205 may include a notch 210A and other notches which are not seen in FIG. 2B due to perspective, and as discussed above. Body 205 may include a port 215 which includes threads 220 which may connect to either protrusion 110 or protrusion 315, as will be discussed below.

Figure 3:
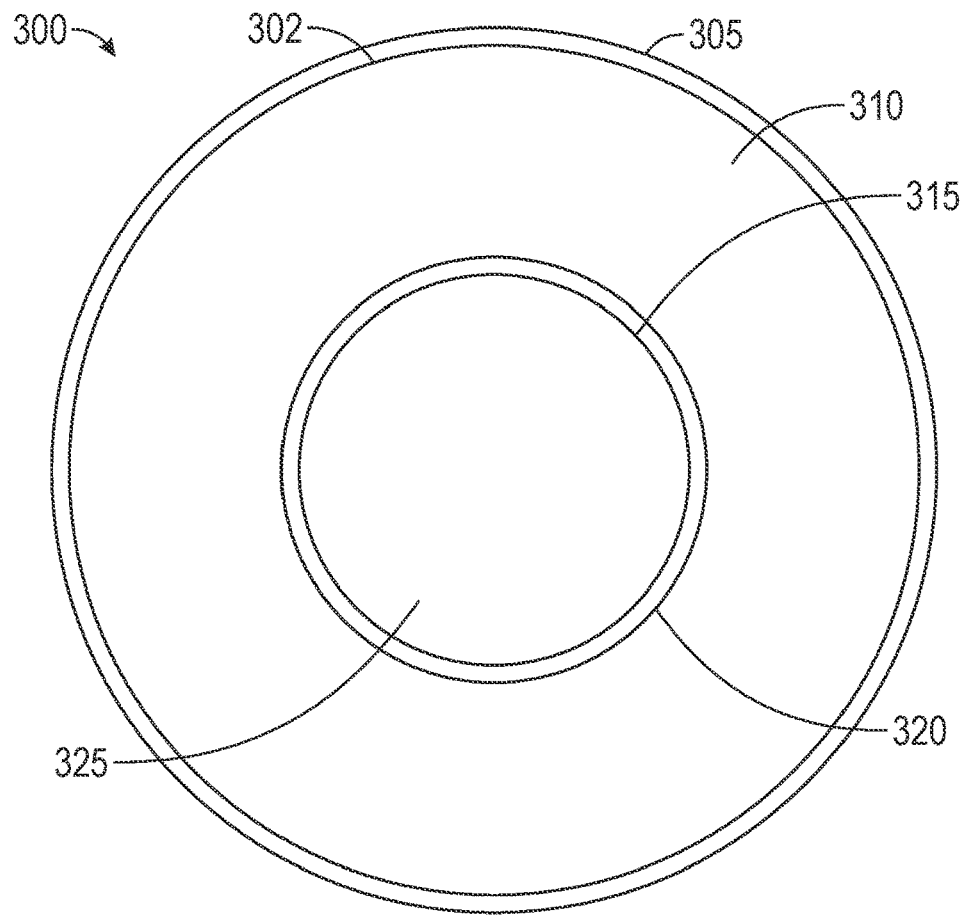
FIG. 3 illustrates a top view of a second embodiment of a water carrier adapter device.

FIG. 3 illustrates a top view of a second embodiment of a water carrier adapter device 300. Water carrier adapter device 300 includes a body 302 which includes a plurality of threads 305 which acts as a bung connector 310. In one embodiment, water carrier adapter device 300 may include threads 305 which connect to a bung hole in a standard 55 gallon drum. Body 302 may further include a protrusion 315 which extends from bung connector 310 and may also include threads, such as threads 320. Body 302 may further include a port 325 which allows water or another liquid to flow through body 302 of water carrier adapter device 300.

Figure 4:
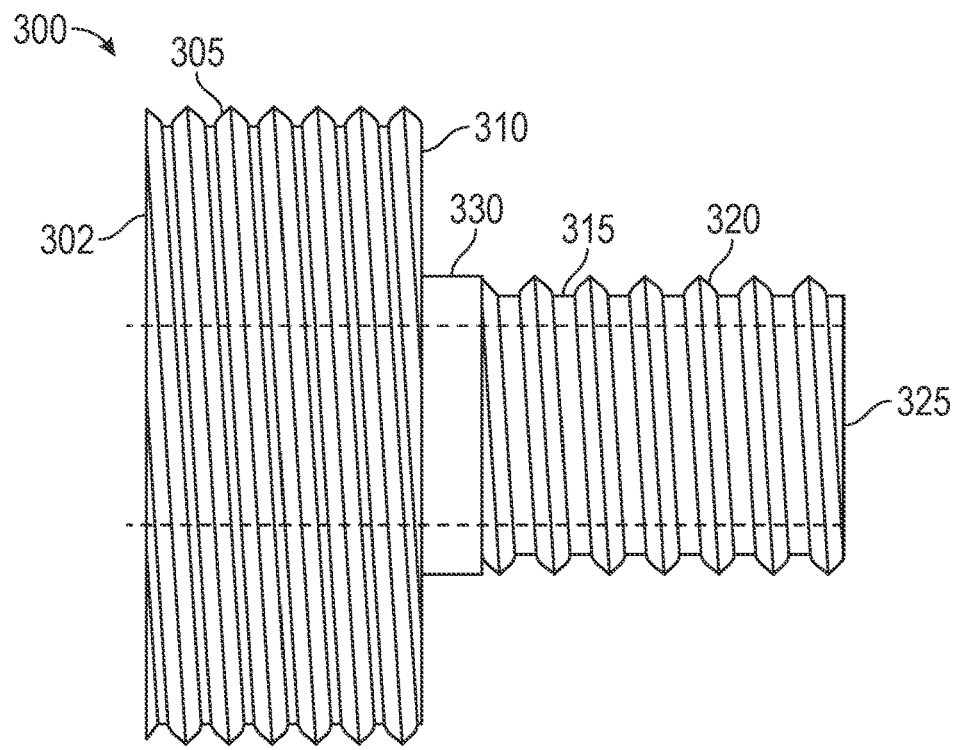
FIG. 4 illustrates a side view of a second embodiment of a water carrier adapter device.

FIG. 4 illustrates a side view of a second embodiment of a water carrier adapter device 300. Water carrier adapter device 300 includes a body 302 which includes a plurality of threads 305 which acts as a bung connector 310. In one embodiment, water carrier adapter device 300 may include threads 305 which connect to a bung hole in a standard 55 gallon drum. Body 302 may further include a protrusion 315 which extends from bung connector 310 and may also include threads, such as threads 320. Body 302 may further include a port 325 which allows water or another liquid to flow through body 302 of water carrier adapter device 300. Optionally, body 302 may be further fitted with a tool assist 330 which allows a user to use a tool such as a socket or a wrench to turn body 302 into a bung hole of a 55 gallon drum. Tool assist 330 may be implemented as being square, hexagonal, or octagonal or any other geometric shape known in the art which provides surfaces for a tool to connect to and turn body 302. Water carrier adapter device 300 may be made using a plastic or metal material and may be fashioned using any techniques known to those of ordinary skill in the art including additive manufacturing, 3D printing, and milling.

Figure 5:
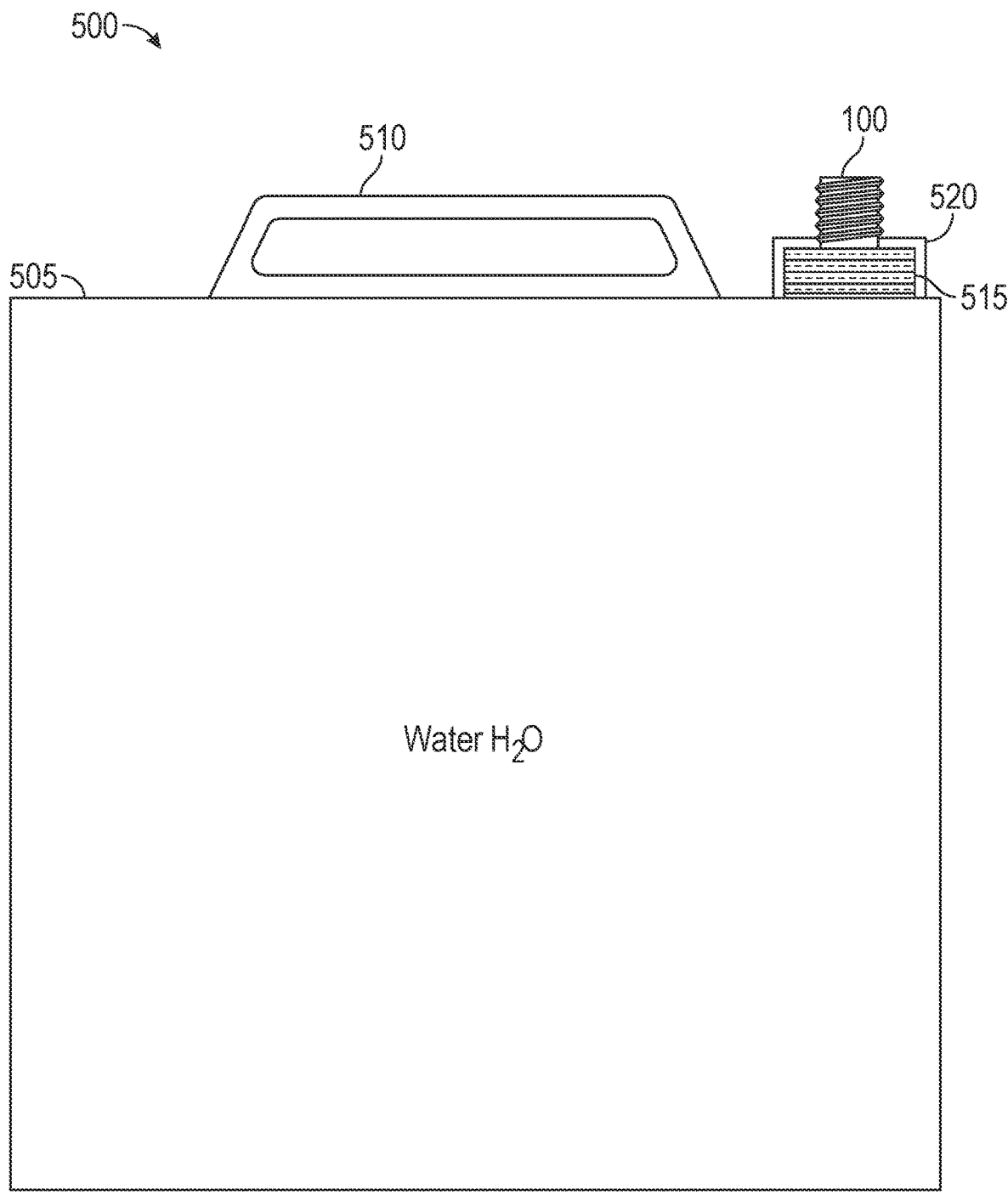
FIG. 5 illustrates a water carrier including one embodiment of a water carrier adapter device.

FIG. 5 illustrates a water carrier 500 including one embodiment of a water carrier adapter device 100. Water carrier 500 may be implemented as a 5 gallon water container having a body 505 and a handle 510. However, it is to be noted that this disclosure relates to any water container which is portable, which is defined herein as carrying 10 gallons of water or less. These containers are readily available for carrying water on, for example, an outdoor adventure. As shown in FIG. 5, water container 500 includes a threaded opening 515 which conventionally attaches a valve of a push button or lever type to water carrier 505 by use of a cap nut 520. As shown in FIG. 5, cap nut 520 threads on to threaded opening 515 of water carrier 500. Cap nut 520 may include a hole which allows protrusion 110 of water carrier adapter device 100 to extend out of cap nut 520. While this advantageously exposes threads 115 on protrusion 110 (shown in FIG. 1), cap nut 520 further serves to tightly secure flange 105 of water carrier adapter device 100 to threaded opening 515 by compression force, and in a leak proof manner. In this manner, water carrier adapter device 100 may be attached to water carrier 500.

Figure 6:
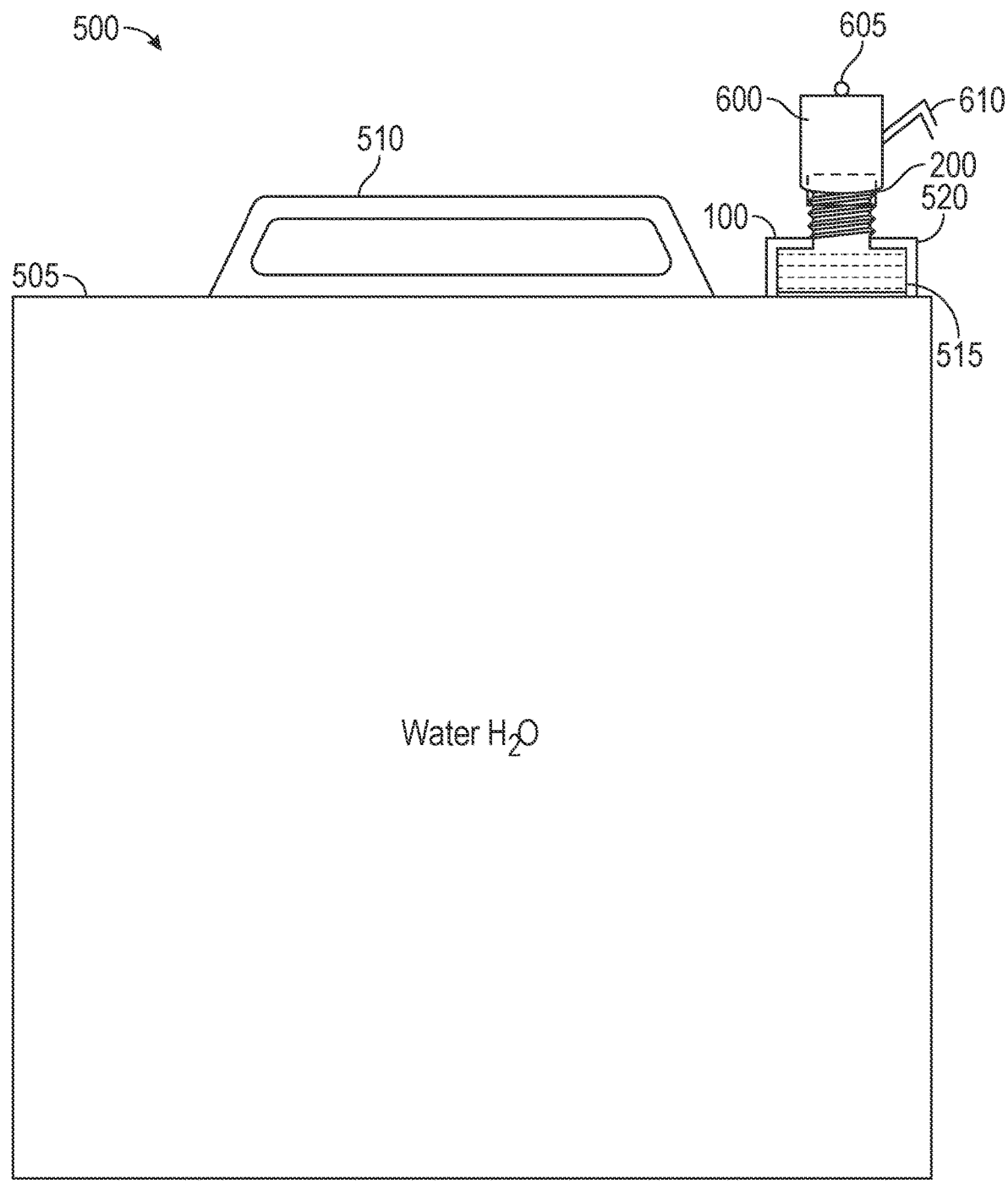
FIG. 6 illustrates a water carrier including one embodiment of a water carrier adapter device connected by a pump collar to an electric pump.

FIG. 6 illustrates a water carrier 500 including one embodiment of a water carrier adapter device 100 connected by a pump collar 200 to an electric pump 600. Water carrier 500 may be implemented as a 5 gallon water container having a body 505 and a handle 510. However, it is to be noted that this disclosure relates to any water container which is portable, which is defined herein as carrying 10 gallons of water or less. These containers are readily available for carrying water on, for example, an outdoor adventure. As shown in FIG. 6, water container 500 includes a threaded opening 515 which conventionally attaches a valve of a push button or lever type to water carrier 505 by use of a cap nut 520. As shown in FIG. 5, cap nut 520 threads on to threaded opening 515 of water carrier 500. Cap nut 520 may include a hole which allows protrusion 110 of water carrier adapter device 100 to extend out of cap nut 520. While this advantageously exposes threads 115 on protrusion 110 (shown in FIG. 1), cap nut 520 further serves to tightly secure flange 105 of water carrier adapter device 100 to threaded opening 515 by compression force, and in a leak proof manner. In this manner, water carrier adapter device 100 may be attached to water carrier 500.

As further shown in FIG. 6, pump collar 200 may be connected by threads 220, shown in FIG. 2 to water carrier adapter device 100 in that protrusion 110 may thread into port 215. Pump collar 200 may further be installed within an intake of pump 600 by notches 210A-210D, for example to secure pump 600 to pump collar 200. Pump 600 may be an electrical pump and may include rechargeable batteries. Pump 600 may further include one or more electrical connectors for recharging batteries or connecting to a regulated output of one or more solar panels. Pump 600 may include a button 605 with a single function or a dual function. For example, pump 600 may have a single function of turning on with a button push until a subsequent button push turns pump 600 off. Alternatively, or additionally, pump 600 may further have a double function button 605 which can either pump water only while button 605 is depressed or pushed or pump water in response to depressing button 605 until button 605 is again depressed, turning off the water. Pump 600 may further be fitted with a spout 610 which directs water flow in a useful direction without having to tip or re-orient water container 500 from an upright traveling position.

Figure 7:
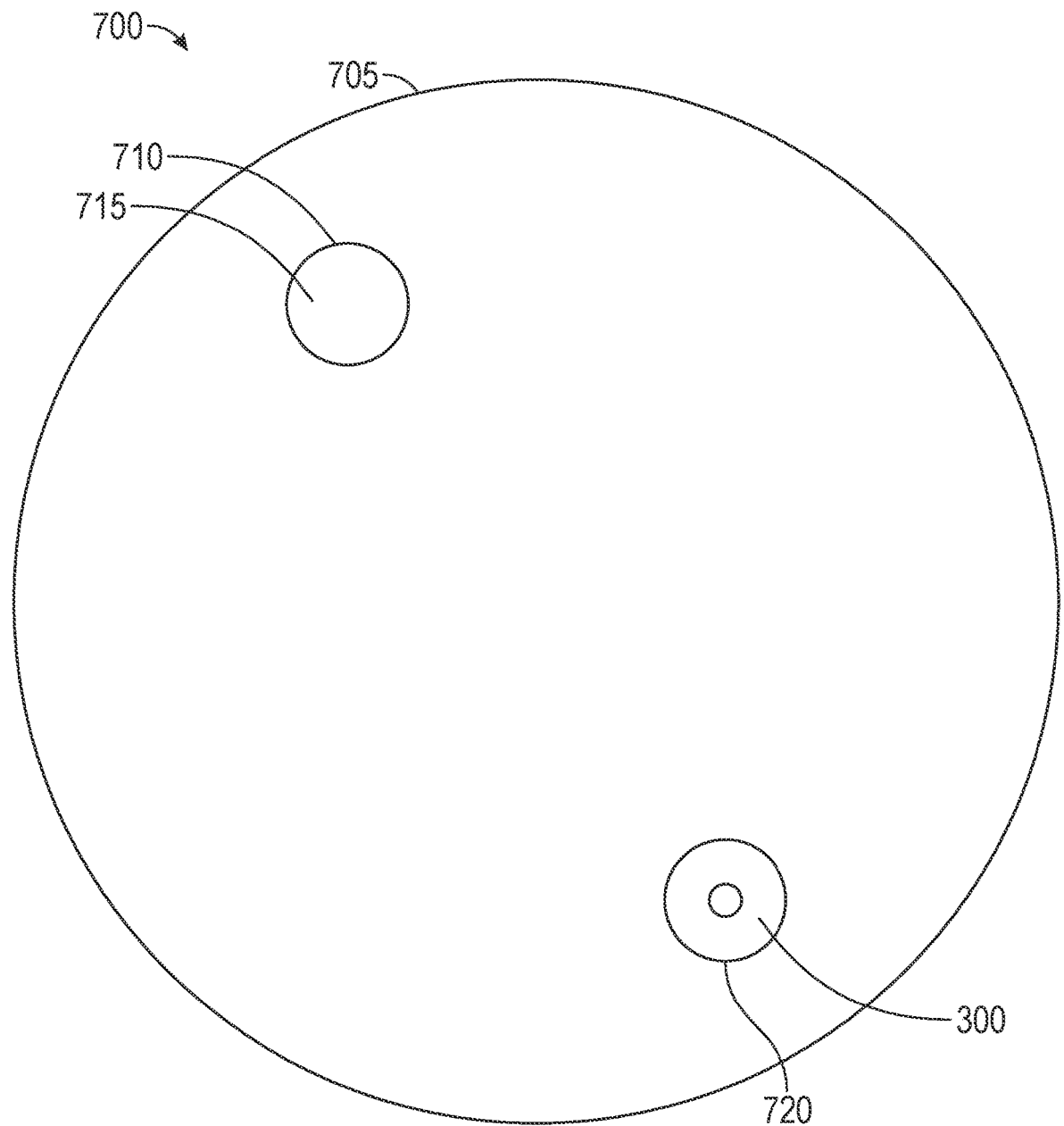
FIG. 7 illustrates a top view of a water carrier including a second embodiment of a water carrier adapter device.

FIG. 7 illustrates a top view of a water carrier 700 including a second embodiment of a water carrier adapter device 300. Water carrier 700 may be implemented as a standard 55 gallon drum 705, for example. Drum 705 may be a non-portable water carrier as it contains more than 10 gallons of water. While a 55 gallon drum of water is technically portable in the broadest sense of the term, it is noted that the effort of moving the drum by means of manpower is sufficiently high that for the purposes of this disclosure a 55 gallon drum of water is considered non-portable (including whether or not the 55 gallon drum of water is full of water or empty—even if the drum is movable by manpower when empty, an empty drum is not useful unless filled with water). Drum 705 may include a first bung hole 710 which may include threads 715. Drum 705 may further include a second bung hole 720 within which is disposed water carrier adapter 300. Second bung hole 720 may include threads (not shown) which connect to threads 305 on body 302 of water carrier adapter 300.

Figure 8:
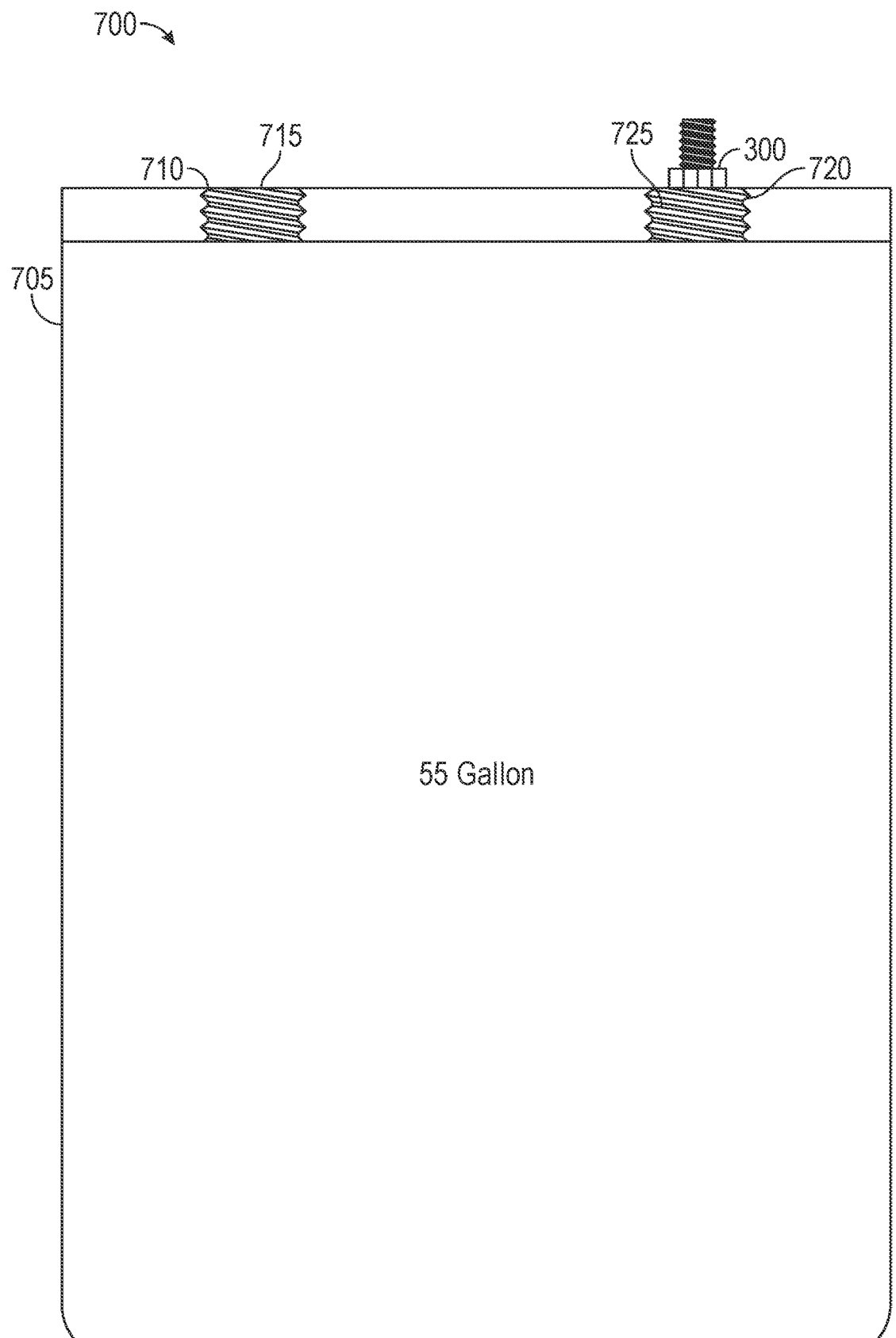
FIG. 8 illustrates a side view of a water carrier including a second embodiment of a water carrier adapter device.

FIG. 8 illustrates a side view of a water carrier 700 including a second embodiment of a water carrier adapter device 300. Water carrier 700 may be implemented as a standard 55 gallon drum 705, for example. Drum 705 may include a first bung hole 710 which may include threads 715. Drum 705 may further include a second bung hole 720 within which is disposed water carrier adapter 300. Second bung hole 720 may include threads 725 which connect to threads 305 on body 302 of water carrier adapter 300.

Figure 9:
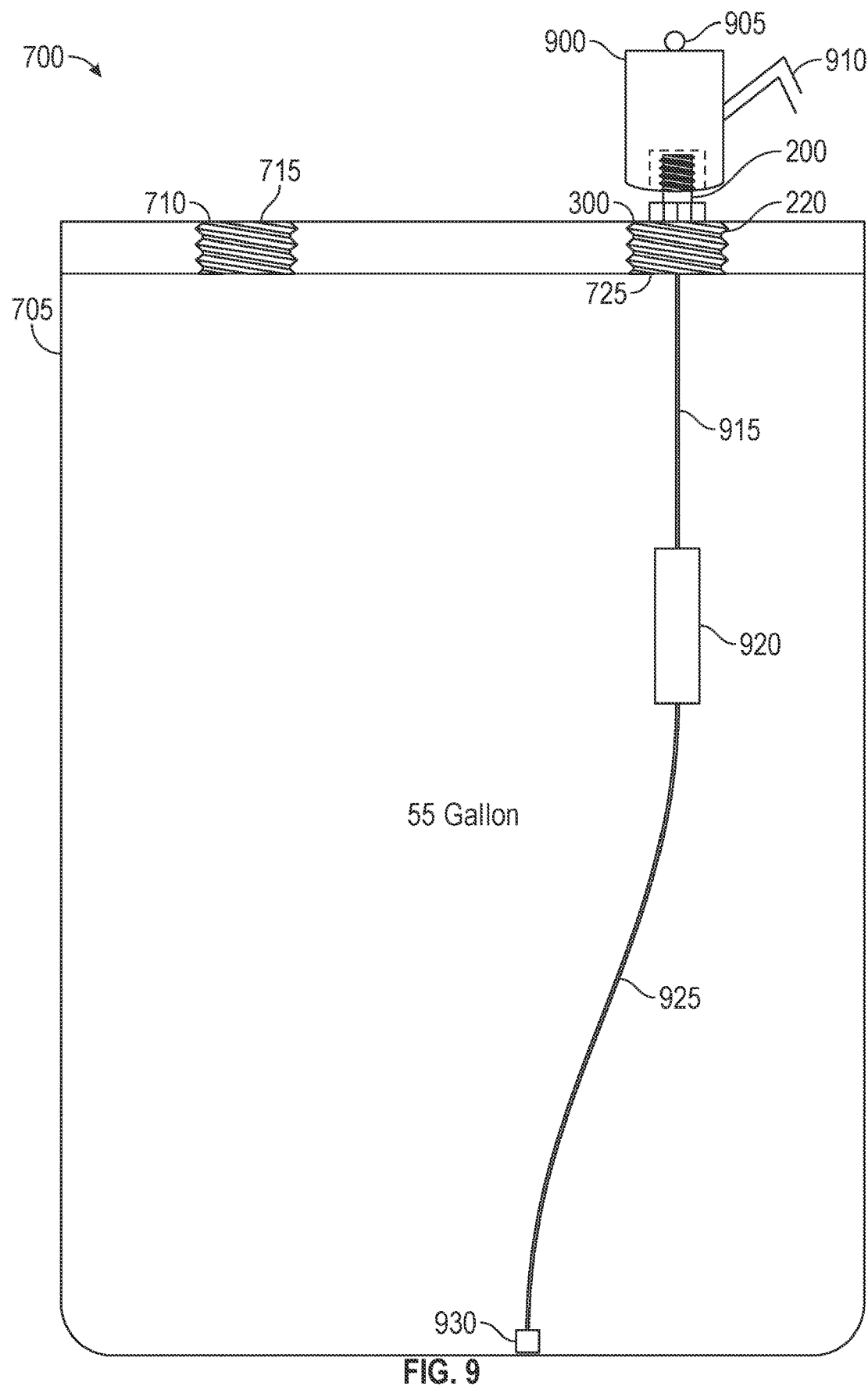
FIG. 9 illustrates a side view of a water carrier including a second embodiment of a water carrier adapter device connected by a pump collar to an electric pump and which includes an inline water filter.

FIG. 9 illustrates a side view of a water carrier 700 including a second embodiment of a water carrier adapter device 300 connected by a pump collar 200 to an electric pump 600 and which includes an inline water filter 920. Water carrier 700 may be implemented as a standard 55 gallon drum 705, for example. Drum 705 may include a first bung hole 710 which may include threads 715. Drum 705 may further include a second bung hole 720 within which is disposed water carrier adapter 300. Second bung hole 720 may include threads 725 which connect to threads 305 on body 302 of water carrier adapter 300. Protrusion 315 extends out from bung hole 720 with threads 320 to connect with pump collar 200.

Pump collar 200 may be connected to adapter 300 by threads 220, shown in FIG. 2 to water carrier adapter device 300 in that protrusion 315 may thread into port 215. Pump collar 200 may further be installed within an intake of pump 900 by notches 210A-210D, for example to secure pump 900 to pump collar 200. Pump 900 may be an electrical pump and may include rechargeable batteries. Pump 900 may further include one or more electrical connectors for recharging batteries or connecting to a regulated output of one or more solar panels. Pump 900 may include a button 905 with a single function or a dual function. For example, pump 900 may have a single function of turning on with a button push until a subsequent button push turns pump 900 off. Alternatively, or additionally, pump 900 may further have a double function button 905 which can either pump water only while button 905 is depressed or pushed or pump water in response to depressing button 905 until button 905 is again depressed, turning off the water. Pump 900 may further be fitted with a spout 910 which directs water flow in a useful direction Pump 900 may further be connected to a line 915 which may be tubing or a pipe which extends through port 215 in pump collar 200 and port 325 in water carrier adapter device 300 and into drum 705. Line 915 may connect to an in-line water filter 920. In-line water filter 920 may include an intake and an output and have a specified direction of flow for drawing water through in-line water filter 920. An output of water filter 920 may be connected to another or secondary line 925 which may include a water pickup 930 which may be weighted or rest on a bottom of drum 705 to draw water from a bottom of drum 705. As the water is drawn into secondary line 925 by pump 900, water passes into in-line filter 920 in the correct direction for water filtration and is output into line 915. Water from line 915 may travel through port 325 in water carrier adapter device 300 and port 215 in pump collar 200 into pump 900 and out through spout 910 as clean filtered water.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A kit, comprising:
   a plurality of adapters, each one of the plurality of adapters including a threaded protrusion, the each one of the plurality of adapters further including a port which extends through the adapter;
   a pump collar which connects to the adapter;
   a battery powered electric pump which connects to the pump collar by threads internal to the pump body such that the battery powered electric pump is disposed entirely externally to a container; and
   tubing which connects to the battery powered electric pump and to a weighted pickup.

2. The kit of claim 1, further comprising an in-line filter.

3. The kit of claim 2, further comprising tubing connectable to the in-line filter.

4. The kit of claim 3, further comprising a water pickup, connectable to the tubing.

5. The kit of claim 1, wherein the pump further includes a spout for directing water pumped from a water container.

6. The kit of claim 1, wherein the pump further includes a push button.

7. The kit of claim 6, wherein the push button is a double function button.

8. The kit of claim 1, wherein the adapter includes a flange.

9. The kit of claim 8, wherein the battery powered electric pump attaches to the adapter.

10. The kit of claim 8, wherein the adapter is connectable to a water carrier by a cap nut securing the flange of the adapter to the water carrier.

11. The kit of claim 1, wherein the adapter includes a bung connector.

12. A water carrier system, comprising:
    an adapter including a threaded protrusion, the adapter further including a port which extends through the adapter;
    a pump collar which connects to the adapter;
    a battery powered electric pump which is connectable to a water carrier by the connection of the pump collar to the adapter, the battery powered electric pump having internal threads which connect to the pump collar such that the pump is disposed entirely externally to a container; and
    tubing which connects to the battery powered electric pump and to a weighted pickup.

13. The system of claim 12, further comprising an in-line filter and tubing connectable to the inline filter.

14. The system of claim 13, further comprising a water pickup, connectable to the tubing.

15. The system of claim 12, wherein the pump further includes a spout for directing water pumped from the water carrier.

16. The system of claim 12, wherein the pump further includes a push button.

17. The system of claim 16, wherein the push button is a double function button.

18. The system of claim 12, wherein the adapter further includes a flange.

19. The system of claim 18, wherein the adapter is connectable to the water carrier by the flange and the battery powered electric pump attaches to the adapter.

20. The system of claim 12, wherein the adapter includes a bung connector.

* * * * *